US011882907B2

(12) United States Patent
Ono et al.

(10) Patent No.: US 11,882,907 B2
(45) Date of Patent: Jan. 30, 2024

(54) LASER WELDABLE HOOK-AND-LOOP FASTENER

(71) Applicant: KURARAY FASTENING CO., LTD., Osaka (JP)

(72) Inventors: Satoru Ono, Sakai (JP); Yoshikatsu Fujisawa, Sakai (JP)

(73) Assignee: Kuraray Fastening Co., Ltd., Osaka (JP)

( * ) Notice: Subject to any disclaimer, the term of this patent is extended or adjusted under 35 U.S.C. 154(b) by 312 days.

(21) Appl. No.: 17/595,103

(22) PCT Filed: May 21, 2020

(86) PCT No.: PCT/JP2020/020082
§ 371 (c)(1),
(2) Date: Nov. 9, 2021

(87) PCT Pub. No.: WO2020/235624
PCT Pub. Date: Nov. 26, 2020

(65) Prior Publication Data
US 2022/0211147 A1   Jul. 7, 2022

(30) Foreign Application Priority Data

May 21, 2019 (JP) .............................. 2019-094986
May 21, 2019 (JP) .............................. 2019-094987

(51) Int. Cl.
*A44B 18/00*   (2006.01)
(52) U.S. Cl.
CPC ...... *A44B 18/0073* (2013.01); *A44B 18/0061* (2013.01)
(58) Field of Classification Search
CPC .......................... A44B 18/0061; A44B 18/0073
See application file for complete search history.

(56) References Cited

U.S. PATENT DOCUMENTS 4,454,183 A * 6/1984 Wollman ........... A44B 18/0042
428/92
2004/0172793 A1* 9/2004 Gallant .............. A44B 18/0042
24/451
(Continued)

FOREIGN PATENT DOCUMENTS

JP   H08-504348 A   5/1996
JP   2000204239 A   7/2000
(Continued)

OTHER PUBLICATIONS

Extended European Search Report dated May 26, 2023 in Patent Application No. 20809543.0.
(Continued)

*Primary Examiner* — Jason W San
(74) *Attorney, Agent, or Firm* — Element IP, PLC

(57) ABSTRACT

A laser weldable hook-and-loop fastener contains a laser light transmitting male-type molded hook-and-loop fastener (A) and a laser light absorbing layer (B) formed of a thermoplastic resin, which is integrated on the back surface of the male-type molded hook-and-loop fastener (A). The male-type molded hook-and-loop fastener (A) has a base plate and a large number of male-type engaging elements rising from the surface of the base plate. The male-type engaging elements and the base plate are formed of the same resin selected from a polyester elastomer and a polyamide, the male-type engaging elements are arranged in a row, and the laser light absorbing layer (B) has an infrared absorptance of 85% or more at a wavelength of 980 nm.

15 Claims, 1 Drawing Sheet

(56) References Cited

U.S. PATENT DOCUMENTS

| | | | | |
|---|---|---|---|---|
| 2004/0261232 | A1* | 12/2004 | Kurtz, Jr. | A61F 13/625 24/452 |
| 2010/0095489 | A1* | 4/2010 | Tuma | A44B 18/0049 156/298 |
| 2010/0181817 | A1* | 7/2010 | Tanaka | D04B 21/16 24/442 |
| 2015/0197074 | A1* | 7/2015 | Takahashi | B29C 65/1677 156/247 |
| 2015/0275941 | A1* | 10/2015 | Nisogi | A44B 18/0065 403/364 |
| 2017/0066181 | A1* | 3/2017 | Poulakis | B29C 65/1609 |
| 2018/0008010 | A1* | 1/2018 | Verstraete | A44B 18/0069 |
| 2021/0204660 | A1* | 7/2021 | Chou | A44B 18/0019 |
| 2022/0332057 | A1* | 10/2022 | Totani | B29C 65/1635 |

FOREIGN PATENT DOCUMENTS

| | | | |
|---|---|---|---|
| JP | 2013095804 | A | 5/2013 |
| JP | 2014122545 | A | 7/2014 |
| JP | 2016028794 | A | 3/2016 |
| JP | 2016214716 | A | 12/2016 |
| JP | 20170001555 | A | 1/2017 |

OTHER PUBLICATIONS

International Search Report dated Jul. 7, 2020 in PCT/JP2020/020082, 5 pages (with English translation).

* cited by examiner

[Fig. 1]
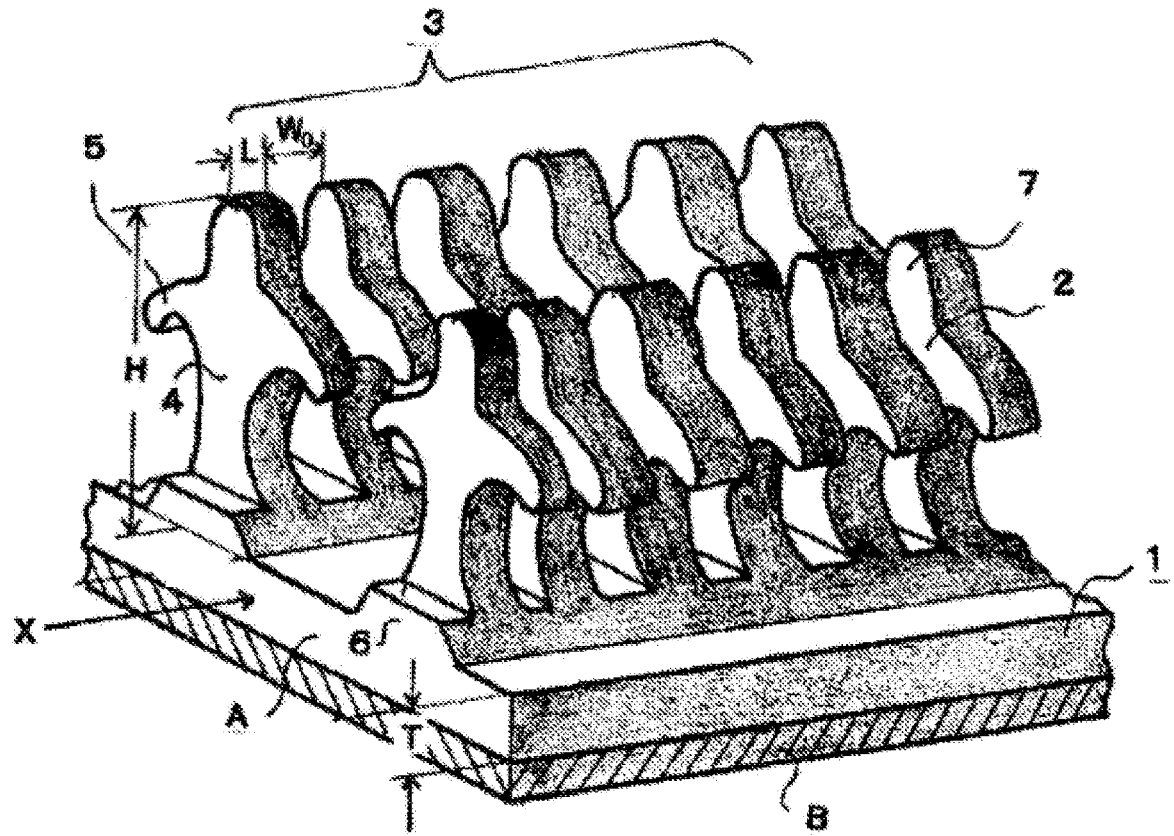
[Fig. 2]
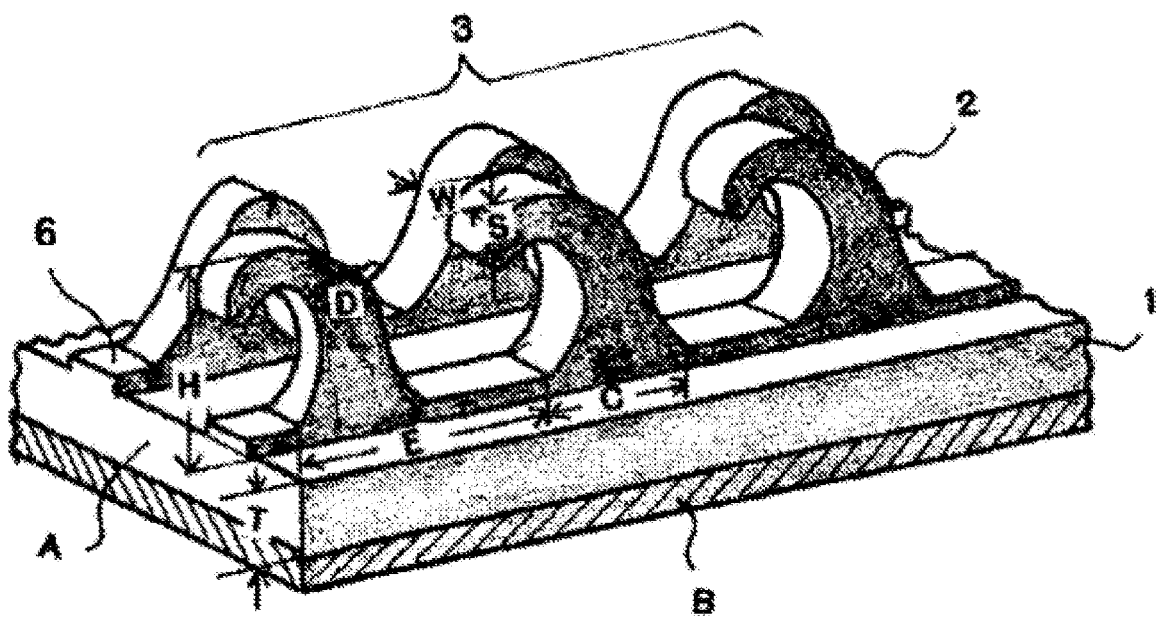

LASER WELDABLE HOOK-AND-LOOP FASTENER

TECHNICAL FIELD

The present invention relates to a laser weldable molded hook-and-loop fastener suitable for fixing an interior material for automobiles such as a ceiling material or a floor material to a vehicle body. A laser light absorbing layer integrated with the back surface of a male-type molded hook-and-loop fastener is melted by a laser light. The shape and performance of the male-type molded hook-and-loop fastener are not impaired by heat from the laser light absorbing layer, and the male-type molded hook-and-loop fastener can be firmly welded to the back surface of the interior material for automobiles through the laser light absorbing layer in which the male-type molded hook-and-loop fastener is melted.

BACKGROUND ART

Conventionally, as one of means for attaching other object to the surface of an object, a method has been used in which a male-type hook-and-loop fastener having a hook-type engaging element is fixed to the surface of one of two objects, a female-type hook-and-loop fastener having a loop-type engaging element is fixed to the surface of the other object, and the engaging elements of both hook-and-loop fasteners are engaged to fix the other object to the surface of the object.

Also in the field of automobile manufacturing, a combination of a male-type hook-and-loop fastener and a female-type hook-and-loop fastener is used as means for fixing an interior material such as a ceiling material or a floor material to a vehicle body. Specifically, a method is used in which the male-type hook-and-loop fastener is attached to the back surface of an interior material for automobiles, the female-type hook-and-loop fastener is attached to a vehicle body main body side, and both hook-and-loop fasteners are engaged with each other to fix the interior material for automobiles to the vehicle body main body.

As the male-type hook-and-loop fastener, there is known a male-type woven fabric hook-and-loop fastener in which a male-type engaging element formed of monofilament is fixed to the surface of a fabric base cloth. The male-type woven fabric hook-and-loop fastener has an advantage that engaging force does not decrease even if engagement and peeling are repeated, but on the other hand, the engaging force is low and is not suitable as a hook-and-loop fastener for fixing an interior material for automobiles which requires a high engaging force. Therefore, a male-type molded hook-and-loop fastener capable of obtaining a high engaging force is preferable for fixing the interior material for automobiles.

Accordingly, it has been proposed to use a male-type molded hook-and-loop fastener for fixing an interior material for automobiles.

PTL 1 describes, as a male-type molded hook-and-loop fastener used for fixing a ceiling material for automobiles to a vehicle body, a male-type molded hook-and-loop fastener produced from a polyolefin-based thermoplastic resin such as polyethylene or polypropylene, a polyester-based thermoplastic resin such as polyethylene terephthalate or polybutylene terephthalate, a polyamide-based thermoplastic resin such as nylon 6 or nylon 66, a polyester-based elastomer resin, a polyolefin-based elastomer resin, or a polyurethane-based elastomer resin. This male-type molded hook-and-loop fastener is attached to the back surface of an interior material for automobiles by an adhesive, a pressure-sensitive adhesive, melting, sewing, a stapler, or the like.

PTL 2 also describes that a male-type molded hook-and-loop fastener made of the same resin as the resin described in PTL 1 is attached to the back surface of an interior material for automobiles with a pressure-sensitive adhesive.

In the case of a method of attachment using a pressure-sensitive adhesive or an adhesive, it is required to have a high pressure-sensitive adhesive force or adhesive force even at a high temperature exceeding 120° C., and further, it is required that such a high pressure-sensitive adhesive force or adhesive force does not decrease over a long period of time. However, there are few pressure-sensitive adhesives and adhesives that satisfy such requirements. In addition, in the case of an adhesive, it is necessary to cure the adhesive after adhesion until sufficient adhesive strength is exhibited, and productivity is poor. Further, there is a problem that a solvent used in the adhesive deteriorates the working environment.

In the case of a method of attaching using a stapler or sewing, a needle is driven from a surface on which a male-type engaging element is present, and sewing is performed with a thread, so that the male-type engaging element is easily damaged. Further, the hook-and-loop fastener is likely to be broken starting from a hole formed by driving a needle or a perforation. Furthermore, since a force applied to the hook-and-loop fastener is concentrated on a position fixed by a stapler or a thread, there is a problem that the hook-and-loop fastener is easily broken from the position.

PTL 3 describes that a hot melt adhesive is applied to the back surface of a male-type molded hook-and-loop fastener made of the same resin as the resin described in PTL 1, and the hook-and-loop fastener is attached to the back surface of an interior material for automobiles by melting the hot melt adhesive.

However, in the case of a method of bonding using a hot melt adhesive, when a hot melt adhesive that can withstand high temperatures is used, the base plate of the hook-and-loop fastener tends to be softened by heat generated when the hot melt adhesive is melted, and since the hook-and-loop fastener is pressure bonded to the back surface of an interior material for automobiles in a softened state, the male-type engaging element rising from the surface of the base plate tends to fall down and the engaging force of the hook-and-loop fastener decreases.

In order to prevent this, it is possible to make the base plate of the hook-and-loop fastener thick so that the heat of the hot melt layer does not reach the male-type engaging element as much as possible. However, the hook-and-loop fastener becomes rigid, and it becomes difficult to attach the hook-and-loop fastener to a curved surface portion of the back surface of the interior material for automobiles. Further, when the back surface of the interior material for automobiles is uneven, it is difficult for the hook-and-loop fastener to conform to the unevenness, and sufficient adhesive strength cannot be obtained.

When the coating amount of the hot melt adhesive is increased so as to obtain sufficient adhesive strength, the hook-and-loop fastener easily moves until the hot melt adhesive is cured, it becomes difficult to fix the hook-and-loop fastener at a predetermined position, and there is a problem that the presence of the adhesive protruding from the back surface of the hook-and-loop fastener deteriorates the appearance.

Further, when a hot melt adhesive that melts at a high temperature is used, the hook-and-loop fastener must be quickly attached to a predetermined position on the back surface of the interior material for automobiles within a short period of time while maintaining a molten state. This operation requires a skilled technique.

PTL 4 describes a laser light transmitting male-type hook-and-loop fastener having a laser light absorbing layer on the back surface thereof. The laser light transmitted through the male-type hook-and-loop fastener is absorbed by the laser light absorbing layer to generate heat, and the male-type hook-and-loop fastener and another object are bonded through the melted laser light absorbing layer.

However, only special inorganic/organic elastomers (crosslinked polyvinyl siloxane, silicone elastomer) are described as materials for the male-type hook-and-loop fastener. In addition, the laser light absorptance of the laser light absorbing layer is 5 to 40%, and only polyamide to which carbon black is added is described as a material of the laser light absorbing layer.

PTL 5 proposes a semi-aromatic polyamide obtained by using 1,9-nonanediamine and 2-methyl-1,8-octanediamine as diamine components and terephthalic acid as an aromatic dicarboxylic acid component as a heat-resistant resin that can sufficiently withstand use in a high-temperature atmosphere. Numerous applications of this semi-aromatic polyamide resin are listed in this publication, and a fastener is also described therein.

However, in general, a fastener means a slide fastener in many cases, and means a hook-and-loop fastener in few cases. Further, since PTL 5 does not describe a hook-and-loop fastener, the male-type molded hook-and-loop fastener to which the present invention is directed cannot be conceived simply from the description of a fastener.

CITATION LIST

Patent Literature

PTL 1: JP 2016-28794 A
PTL 2: JP 2016-214716 A
PTL 3: JP 2017-1555 A
PTL 4: US 2017/0,066,181 A1
PTL 5: JP 2000-204239 A

SUMMARY OF INVENTION

Technical Problem

The present invention provides a technique for attaching a male-type molded hook-and-loop fastener to the back surface of an interior material for automobiles, and a hook-and-loop fastener suitably used for the technique, which solves the problems of the above-described conventional methods for attaching by a pressure sensitive adhesive, an adhesive, a stapler, or sewing.

Further, the present invention provides a method for quickly and accurately attaching a hook-and-loop fastener to a predetermined position on the back surface of an interior material for automobiles without causing the engaging elements of the hook-and-loop fastener to fall down by pressure bonding as in a method for attaching a hook-and-loop fastener to the back surface of an interior material for automobiles by simply heating and melting a hot melt adhesive applied to the back surface of a male-type molded hook-and-loop fastener, and a male-type molded hook-and-loop fastener suitably used therefor.

Solution to Problem

That is, the present invention is a laser weldable hook-and-loop fastener containing a laser light transmitting male-type molded hook-and-loop fastener (A) and a laser light absorbing layer (B) formed of a thermoplastic resin, which is integrated on the back surface of the male-type molded hook-and-loop fastener (A), wherein the male-type molded hook-and-loop fastener (A) has a base plate and a large number of male-type engaging elements rising from the surface of the base plate, the male-type engaging elements and the base plate are formed of the same resin selected from a polyester elastomer and a polyamide, the male-type engaging elements are arranged in a row, and the laser light absorbing layer (B) has an infrared absorptance of 85% or more at a wavelength of 980 nm.

In one aspect of the present invention, the male-type engaging element is an engaging element (hereinafter sometimes referred to as an "arrowhead type engaging element") having a stem portion rising from a base plate and a protruding portion protruding symmetrically from the stem portion in a direction substantially orthogonal to a row direction of the male-type engaging elements from the middle or the tip of the male-type engaging element, and the tip of the male-type engaging element approaches the surface of the base plate. Note that the term "substantially orthogonal" refers to an angle of about 90°±45°, preferably about 90°±20° with respect to the row direction. In addition, symmetry means that in a pair of protruding portions protruding from the stem portion, the maximum width in the height direction of the stem portion in one protruding portion is 80 to 120%, and preferably 90 to 110% of the maximum width in the height direction of the stem portion in the other protruding portion, the maximum height from the surface of the base plate at the position of the base of one protruding portion with the stem portion is 80 to 120%, and preferably 90 to 110% of the maximum height from the surface of the base plate at the position of the base of the other protruding portion with the stem portion, and the length of protrusion from the stem portion in one protruding portion is 80 to 120%, and preferably 90 to 110% of the length of protrusion from the stem portion in the other protruding portion.

In one aspect of the present invention, the male-type engaging element is an engaging element (hereinafter sometimes referred to as "inverted J-shaped engaging element") that rises from the base plate, gradually tapers from the root to the tip without branching in the middle or at the tip portion, bends in the same direction as the row direction of the male-type engaging elements in the middle, and has a shape in which the tip approaches the surface of the base plate.

In one aspect of the present invention, the infrared transmittance at a wavelength of 980 nm is 50% or more in the male-type molded hook-and-loop fastener (A) and 10% or less in the laser light absorbing layer (B), and the infrared absorptance at a wavelength of 980 nm is 30% or less in the male-type molded hook-and-loop fastener (A).

In one aspect of the present invention, a continuous ridge portion is present on the surface of the base plate in a row direction of the engaging elements, the male-type engaging elements rise from the surface of the ridge portion, and the row of the male-type engaging elements is formed along the ridge of the continuous ridge portion.

In one aspect of the present invention, the base plate of the male-type molded hook-and-loop fastener (A) in which the male-type engaging element is an arrowhead type engaging element has a thickness of 0.1 to 0.3 mm, and a height of the male-type engaging element from the surface of the base plate is 2 to 4 mm. The thickness of the base plate of the male-type molded hook-and-loop fastener (A) in which the male-type engaging element is an inverted J-shaped engaging element is 0.1 to 0.3 mm, and the height of the male-type engaging element from the surface of the base plate is 0.35 to 1.5 mm.

In one aspect of the present invention, the laser light absorbing layer (B) is a fabric made of fibers containing carbon black and having a melting point of 130 to 270° C. or a film made of a resin containing carbon black and having a melting point of 130 to 270° C., and the fabric and the film have a basis weight of 50 to 200 g/m$^2$.

In one aspect of the present invention, a gap between the stem portions of two arrowhead type engaging elements adjacent to each other in the row direction is 0.3 to 0.8 times a width of the stem portion of the arrowhead type engaging element in the row direction.

In one aspect of the present invention, the male-type molded hook-and-loop fastener (A) is dyed with an acid dye or a disperse dye.

In one aspect of the present invention, the polyamide is a semi-aromatic polyamide, and particularly preferably a semi-aromatic polyamide obtained from 1,9-nonanediamine and terephthalic acid as main components or a semi-aromatic polyamide obtained from a mixed diamine containing 1,9-nonanediamine and 2-methyl-1,8-octanediamine and terephthalic acid as main components. The semi-aromatic polyamide is preferably blended with an elastomer.

In one aspect of the present invention, the present invention provides a method of manufacturing an interior material for automobiles in which the laser weldable hook-and-loop fastener is welded on the back surface. The manufacturing method includes the steps of; superposing the laser weldable hook-and-loop fastener at a predetermined position on the back surface of the interior material for automobiles via the laser light absorbing layer (B); irradiating laser light from the front surface side of the laser weldable hook-and-loop fastener to melt the laser light absorbing layer (B) without melting the male-type molded hook-and-loop fastener (A); and pressure bonding the laser weldable hook-and-loop fastener to the back surface of the interior material for automobiles while the laser light absorbing layer (B) is melted to weld the laser weldable hook-and-loop fastener to the back surface of the interior material for automobiles.

Advantageous Effects of Invention

The laser weldable hook-and-loop fastener of the present invention is suitably used as a hook-and-loop fastener to be laser-welded to the back surface of an interior material for automobiles. The laser light is transmitted through the male-type molded hook-and-loop fastener (A) without generating heat, is absorbed by the laser light absorbing layer (B) integrally formed on the back surface of the male-type molded hook-and-loop fastener (A) to generate heat, and melts only the laser light absorbing layer (B). The melted laser light absorbing layer (B) acts as an adhesive layer between the male-type molded hook-and-loop fastener (A) and the interior material for automobiles.

Since the male-type molded hook-and-loop fastener (A) is hardly affected by heat from the melted laser light absorbing layer (B), the male-type engaging elements present on the surface of the male-type molded hook-and-loop fastener (A) hardly fall down even when the male-type molded hook-and-loop fastener (A) is pressure bonded to the back surface of the interior material for automobiles.

Further, since the laser weldable hook-and-loop fastener can be accurately placed at a predetermined position on the back surface of the interior material for automobiles via the laser light absorbing layer (B), the male-type molded hook-and-loop fastener (A) can be accurately welded at a predetermined position on the back surface of the interior material for automobiles.

Therefore, when the laser weldable hook-and-loop fastener of the present invention is used, it is possible to easily and quickly weld the hook-and-loop fastener to an accurate position on the back surface of the interior material for automobiles, which has been difficult in the prior art.

BRIEF DESCRIPTION OF DRAWINGS

FIG. 1 is a schematic perspective view illustrating an example of the laser weldable hook-and-loop fastener of the present invention.

FIG. 2 is a schematic perspective view illustrating another example of the laser weldable hook-and-loop fastener of the present invention.

DESCRIPTION OF EMBODIMENTS

Next, the laser weldable hook-and-loop fastener of the present invention will be described in detail with reference to the drawings. First, as shown in FIG. 1, an example of the laser weldable hook-and-loop fastener of the present invention includes a male-type molded hook-and-loop fastener (A) and a laser light absorbing layer (B) integrated with the back surface side of the male-type molded hook-and-loop fastener (A). The male-type molded hook-and-loop fastener (A) includes a base plate (1) and male-type engaging elements (2) (arrowhead type engaging elements) rising from the surface thereof, preferably from the surface of a ridge portion (6) formed on the surface of the base plate, and the male-type engaging elements are arranged in a row (3).

As shown in FIG. 1, the male-type engaging element (2) includes a stem portion (4) rising from the surface of the base plate (1), preferably from the surface of a ridge portion (6) formed on the surface of the base plate, and a protruding portion (5) symmetrically protruding from the stem portion in a direction substantially perpendicular to the direction of the row (3) of male-type engaging elements from the middle or tip thereof. The tip of the protruding portion (5) approaches the base plate surface.

In FIG. 1, a pair of protruding portions (5) protrude bilaterally symmetrically in one stage in the vertical direction from the stem portion (one stage arrowhead type engaging element), but two pairs of protruding portions (5) may protrude bilaterally symmetrically in two stages in the vertical direction (two stage arrowhead type engaging element), or three pairs of protruding portions (5) may protrude bilaterally symmetrically in three stages in the vertical direction (three stage arrowhead type engaging element). The two stage arrowhead type engaging element or the three stage arrowhead type engaging element can prevent the occurrence of lateral displacement after engaging with the engaging counterpart, that is, a loop hook-and-loop fastener. In the two stage arrowhead type engaging element or the three stage arrowhead type engaging element, it is preferable to make the protruding length of the protruding portion of the upper stage shorter than that of the protruding portion of the lower stage in order to increase the engaging force. In the male-type engaging element shown in FIG. 1, a sticking preventing projection (7) is present at the tip portion of the stem portion.

As shown in FIG. 2, another example of the laser weldable hook-and-loop fastener of the present invention includes a male-type molded hook-and-loop fastener (A)

and a laser light absorbing layer (B) integrated with the back surface side of the male-type molded hook-and-loop fastener (A). The male-type molded hook-and-loop fastener (A) includes a base plate (1) and male-type engaging elements (2) (inverted J-shaped engaging elements) rising from the surface thereof, preferably from the surface of a ridge portion (6) formed on the surface of the base plate, and the male-type engaging elements are arranged in a row (3).

As shown in FIG. 2, the male-type engaging element (2) rises from the surface of the base plate (1), bends in the same direction as the direction of the row (3) of male-type engaging elements from the middle without branching in the middle or at the tip portion, and has a shape in which the tip thereof is bent so as to approach the surface of the base plate, that is, an inverted J-shape. As shown in FIG. 2, the male-type engaging element (2) is thick at the base and gradually becomes thinner from the root to the tip.

The base plate and the male-type engaging element of the male-type molded hook-and-loop fastener (A) of the present invention are formed from the same resin selected from a polyester elastomer and a polyamide. The content of the polyester elastomer or the polyamide in the "same resin" is preferably 60% by weight or more, more preferably 80% by weight or more, and still more preferably 87% by weight or more, and may be 100% by weight.

The polyester elastomer is a resin having sufficient properties of an elastic polymer in spite of having a high elastic modulus, and examples thereof include a resin obtained by copolymerizing polyoxytetramethylene glycol with a resin having a butylene terephthalate unit as a main repeating unit. The polyester elastomer is particularly preferable as a material of the male-type molded hook-and-loop fastener (A) having an arrowhead type engaging element. The male-type molded hook-and-loop fastener (A) shown in FIG. 1 produced from a polyester elastomer has excellent properties such that it has a high engaging force with respect to a female-type hook-and-loop fastener (engaging counterpart) attached to a vehicle body for automobiles, the protruding portion (5) of the male-type engaging element is not torn off by repeated engagement and peeling, the female-type engaging element is hardly cut, and the male-type engaging element hardly falls down even when the laser light absorbing layer (B) is pressure bonded from above in a molten state.

The proportion of the [poly(oxytetramethylene)] terephthalate unit in the polyester elastomer is preferably 40 to 70% by weight, and more preferably 50 to 60% by weight based on the weight of the polyester elastomer.

In the laser weldable hook-and-loop fastener of the present invention, it is essential that the male-type molded hook-and-loop fastener (A) transmits a laser light. Therefore, it is preferable that an organic compound or an inorganic compound that shields or absorbs the laser light, such as an inorganic pigment or an inorganic filler, is not added to the polyester elastomer. There is no problem in blending a small amount of a resin or an additive which does not shield or absorb the laser light.

The polyamide is preferably a semi-aromatic polyamide, and is particularly preferable as a material of a male-type molded hook-and-loop fastener (A) having an inverted J-shaped engaging element. The male-type engaging element formed of polyamide has high resilience, is hard to fall down, and is hard to break. Since the male-type engaging element formed from the semi-aromatic polyamide is particularly hard to fall down, the base plate of the male-type molded hook-and-loop fastener (A) can be made thin, and the laser light transmittance can be increased.

The semi-aromatic polyamide is typically obtained from an aliphatic diamine and an aromatic dicarboxylic acid or a derivative thereof. Since the semi-aromatic polyamide is excellent in heat resistance and rigidity, it has an excellent property that the engaging element hardly falls down even when the laser weldable hook-and-loop fastener is pressure bonded from above in a state in which the laser light absorbing layer (B) is melted. Further, the semi-aromatic polyamide is rigid and keeps a high engaging strength even under a high temperature condition, so that it is suitable as an automobile member.

Examples of the aliphatic diamine forming the semi-aromatic polyamide include 1,6-hexanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, and 5-methyl-1,9-nonanediamine. 1,9-nonanediamine or a combination of 1,9-nonanediamine and 2-methyl-1,8-octanediamine is preferable in terms of falling prevention of the male-type engaging element at the time of pressure bonding and moldability.

In a case where 1,9-nonanediamine and 2-methyl-1,8-octanediamine are used in combination as the aliphatic diamine, the molar ratio of 1,9-nonanediamine to 2-methyl-1,8-octanediamine is preferably 40:60 to 95:5 in terms of falling prevention of the male-type engaging element at the time of pressure bonding and engaging force.

As for the aromatic dicarboxylic acid that forms the semi-aromatic polyamide, an aromatic dicarboxylic acid mainly composed of terephthalic acid is preferable in terms of falling prevention of the male-type engaging element at the time of pressure bonding, moldability, and engaging force, and it is most preferable that all of the aromatic dicarboxylic acid is terephthalic acid.

The semi-aromatic polyamide is an extremely rigid resin, and is molded into a male-type molded hook-and-loop fastener by, for example, an injection molding method as described later. In the injection molding method, the male-type engaging element is easily cut at the time of being pulled out from a cavity, and a crack is easily generated in a particularly bent portion of the male-type engaging element. In order to prevent this, it is preferable to add a small amount of elastomer to the semi-aromatic polyamide.

The elastomer to be added is preferably a material having rubber-like elasticity or flexibility at around a normal temperature and capable of being easily molded by softening at a molding temperature, and examples thereof include a styrene-based elastomer, a vinyl chloride-based elastomer, an olefin-based elastomer, a urethane-based elastomer, an ester-based elastomer, and an amide-based elastomer.

The elastomer to be added is preferably a polyolefin-based elastomer, and more preferably a maleic anhydride-modified polyolefin-based elastomer. In particular, when the semi-aromatic polyamide is a terminal amino group-containing polyamide obtained by using 1,9-nonanediamine and 2-methyl-1,8-octanediamine as diamine components and terephthalic acid as a dicarboxylic acid component, the terminal amino group reacts with a functional group derived from maleic anhydride to integrate the semi-aromatic polyamide with the elastomer. As a result, since phase separation occurs during molding of the male-type molded hook-and-loop fastener, it is possible to highly prevent the male-type engaging element from being cut and cracked when the male-type engaging element is pulled out from the cavity.

The amount of the elastomer added to the semi-aromatic polyamide is preferably 2 to 20% by weight, more preferably 4 to 16% by weight, and still more preferably 7 to 13% by weight with respect to 100% by weight of the semi-aromatic polyamide. When the amount is less than 2% by weight, the effect of addition is hardly obtained. When the amount exceeds 20% by weight, the viscosity of the melted elastomer-added semi-aromatic polyamide becomes too high, and it becomes difficult to press-fit it into the cavity.

Other resins, stabilizers, and the like can be added to the semi-aromatic polyamide within a range that does not hinder transmission of the laser light.

As described above, the semi-aromatic polyamide is particularly preferable as the material of the male-type molded hook-and-loop fastener (A), particularly the male-type molded hook-and-loop fastener (A) having an inverted J-shaped engaging element. Further, an aliphatic polyamide represented by nylon-6 can also be used when laser welding is performed with an appropriately low amount of heat, although it has a problem in that the male-type engaging element tends to fall down at the time of laser welding as compared with a male-type engaging element formed of the semi-aromatic polyamide.

Next, a method for producing the male-type hook-and-loop fastener (A) of FIG. 1 will be described.

First, for example, a polyester elastomer is melt-extruded from a nozzle having a slit similar to the cross-sectional shape of the male-type molded hook-and-loop fastener (A) as viewed from the direction of the arrow (X) in FIG. 1, and cooled to mold a tape-shaped article having a plurality of engaging element rows on the surface of the base plate, the engaging element rows rising from the base plate and continuing in the longitudinal direction and having the same cross-section as the male-type engaging elements. When the tape-shaped article is in a molten state, the laser light absorbing layer (B) may be bonded to the back surface of the tape-shaped article. The number of the row is preferably 3 to 8 rows per 1 cm of the tape width after stretching. Further, the tape width is preferably 20 to 80 mm.

Next, cut portions are made for the engaging element row existing on the surface of the resulting tape-shaped article at small intervals in a direction crossing the longitudinal direction of the row, preferably in a direction close to orthogonally, from the upper end of the row to the middle of the height of the row. By making the cut portion not to the base of the row but to the middle of the row, the lower portion of the row in which the cut portion is not made forms a ridge portion (6) continuously existing in the engaging element row direction (3). The ridge portion need not have a uniform height and may be lowered between male-type engaging elements, but are preferably continuous in the longitudinal direction. The interval of the cut portion is preferably 0.2 to 0.6 mm, and more preferably 0.3 to 0.55 mm.

The tape-shaped article is then stretched in the longitudinal direction. The stretching ratio is preferably such that the length of the tape-shaped article after stretching is 1.3 to 1.8 times, and preferably 1.35 to 1.7 times the original length of the tape-shaped article. As a result of this stretching, the cut portions formed in the row are widened to form a row of a large number of independent male-type engaging elements. By setting the stretching ratio to 1.3 to 1.8 times, the gap ($W_O$) between the stem portions of two male-type engaging elements adjacent to each other in the row direction is 0.3 to 0.8 times, and preferably 0.35 to 0.7 times the width (L) of the stem portions of the male-type engaging elements in the row direction. This gap of 0.3 to 0.8 times is narrower than the gap of a conventional male-type hook-and-loop fastener having the same shape. This narrow gap prevents the male-type engaging element from falling down at the time of pressure bonding. The width (L) of the stem portions is preferably 0.15 to 1.5 mm, and more preferably 0.3 to 1.0 mm.

In the male-type molded hook-and-loop fastener (A) thus obtained, the thickness (T) of the base plate (1) is preferably 0.1 to 0.35 mm, more preferably 0.1 to 0.3 mm, and particularly preferably 0.15 to 0.3 mm, from the viewpoint of laser light transmittance. The engaging element density is preferably 30 to 70 elements/cm$^2$, and more preferably 40 to 60 elements/cm$^2$. The height (H) of the male-type engaging element from the surface of the base plate is preferably 2 to 4 mm, and in view of the balance between the engaging force and the difficulty of falling of the engaging element at the time of pressure bonding, it is particularly preferably 2.5 to 3.5 mm. Here, the "engaging element density" means the number (element number) of engaging elements present per unit area (1 cm$^2$) when the male-type molded hook-and-loop fastener (A) is viewed from directly above.

As described above, it is preferable that the tip of the stem portion of the male-type engaging element has a sticking preventing projection (7). The sticking preventing projection (7) is for preventing the occurrence of useless engagement when the interior material for automobiles to which the laser weldable hook-and-loop fastener has been welded for alignment is brought close to the hook-and-loop fastener of an engaging counterpart attached to the vehicle body. In addition, when the male-type molded hook-and-loop fastener (A) is welded to the interior material for automobiles, a force for pressure bonding the male-type molded hook-and-loop fastener (A) from above is concentrated on the sticking preventing projection (7). Therefore, the sticking preventing projection (7) also has an effect of preventing the male-type engaging element from falling down.

The height of the sticking preventing projection (7) is preferably 10 to 40% of the height (H) of the male-type engaging element. Further, the height of the ridge portion (6) is preferably 2 to 30% of the height (H) of the male-type engaging element.

Next, a method for producing the male-type hook-and-loop fastener (A) having the inverted J-shaped engaging elements of FIG. 2 will be described.

As a method for producing the male-type hook-and-loop fastener (A) having the inverted J-shaped engaging elements, for example, a method is used in which a molten resin, preferably a molten polyamide, more preferably a molten semi-aromatic polyamide is poured in a sheet form on the surface of a metal roll having a large number of cavities in the shape of a male-type engaging element on the surface thereof, the molten resin is press-fitted into the cavities, and after solidification, the sheet is peeled off from the metal roll surface, and the male-type engaging element is pulled out from the cavities at the same time to produce a resin sheet having a large number of male-type engaging elements on the surface thereof.

The method of pulling out from the cavities will now be described in more detail.

A ring-shaped die having a thickness of 0.2 to 0.5 mm in which a plurality of cavities having an inverted J-shaped shape are engraved along the outer circumferential direction thereof; a metal ring having no cavity engraved therein; a ring-shaped die having a thickness of 0.2 to 0.5 mm in which a plurality of cavities having an inverted J-shaped shape which is bent in a direction opposite to the above-described inverted J-shaped shape are engraved along the outer circumferential direction thereof; and a metal ring having no cavity engraved therein are successively superposed in this order to prepare a metal roll having a large number of cavities having an inverted J-shaped engaging element shape and a large number of cavities having an inverted J-shaped engaging element bent in the opposite direction thereof on the outer peripheral surface.

In the above-described metal roll, the ring-shaped die having an inverted J-shaped shape cavity and the ring-shaped die having an inverted J-shaped shape cavity facing the opposite direction are superposed one by one, but two or more may be superposed.

On the outer surface of the metal roll thus obtained, a plurality of cavities bent along the circumferential direction are arranged in a row in the circumferential direction. Further, there are a plurality of such rows in the width direction of the metal roll, and the bending direction of the cavities is reversed for each row or for each plurality of rows. The cavity is gradually tapered from the surface of the metal roll to the tip portion, and is gradually bent in the circumferential direction of the metal roll from the middle, and the tip portion faces in a direction approaching the surface of the metal roll.

The male-type molded hook-and-loop fastener (A) can be obtained by flow molding a molten resin, for example, a molten polyamide, preferably a molten semi-aromatic polyamide, on the surface of a metal roll.

In the flow molding, the molten resin is extruded into a gap between a metal roll and another drum roll arranged in a position opposite to the metal roll and the molten resin is pressed to fill the cavity with the molten resin and to form a sheet of the molten resin having a uniform thickness on the surface of the roll, the molten resin in the cavity is cooled and solidified by a refrigerant constantly circulating in the roll while the die roll is rotating, the base plate of the male-type molded hook-and-loop fastener from which the sheet of the molten resin is obtained is stretched to a uniform thickness by using a nip roller with an adjusted gap, the cooled and solidified sheet is peeled off from the surface of the die roll, and the male-type engaging element is pulled out from the cavity.

Thus, a molded hook-and-loop fastener having a large number of male-type engaging elements on the surface thereof is obtained.

When the molten resin is poured on the surface of the metal roll, the laser light absorbing layer (B) may be fusion-laminated on the back surface side of the molded hook-and-loop fastener by supplying a resin to be the laser light absorbing layer (B), a non-woven fabric, a fabric such as a woven or knitted fabric, a film, or the like from a drum roll side disposed at a position facing the metal roll.

In the male-type molded hook-and-loop fastener (A) having an inverted J-shaped engaging element, the male-type engaging element becomes thinner from the root to the tip portion (i.e., the base of the male-type engaging element is thick and becomes thinner toward the tip) and is gradually bent from the middle, the tip portion faces in a direction approaching the surface of the base plate, a plurality of male-type engaging elements that are bent in the same direction are arranged in a row in the bending direction, and one or more rows of male-type engaging elements and one or more rows of male-type engaging elements bent in the opposite direction are alternately arranged.

At the top of the inverted J-shaped engaging element, the width is preferably larger than the thickness. That is, as shown in FIG. 2, the width (W) at the top of the male-type engaging element is preferably larger than the thickness (S), i.e., W>S. By satisfying this, as described above, when the male-type molded hook-and-loop fastener (A) is molded, it is possible to prevent the male-type engaging element from being cut when pulled out from the cavity and to prevent a crack from being formed in the bent portion of the male-type engaging element, and it is also possible to prevent a female-type engaging element which is an engaging counterpart from being cut together with the roundness of the male-type engaging element described above.

The height (H) of the inverted J-shaped engaging element from the front surface of the base plate is preferably 0.35 to 1.5 mm, and more preferably 0.6 to 1.3 mm, the spread (C) of the base portion is preferably 0.7 to 1.5 mm, and more preferably 0.8 to 1.3 mm, and the ratio of C/H is preferably 0.6 to 1.2, and more preferably 0.65 to 1.0. As described above, it is preferable that the base of the inverted J-shaped engaging element is thick, the tip thereof is thin, and the height thereof is low from the viewpoint of difficulty of falling of the inverted J-shaped engaging element and further from the viewpoint of engaging force.

In addition, it is preferable that the spread (D) at the position of $2/3$ of the height (H) from the base is 0.15 to 0.4 mm, and the inverted J-shaped engaging element starts to gradually bend from the vicinity of $1/2$ to $3/4$ of the height from the base.

Further, the width (W) at the top of the male-type engaging element shown in FIG. 2 is preferably 0.2 to 0.4 mm. The width (W) may be the same from the base to the tip portion of the male-type engaging element, or may be gradually tapered toward the tip portion. For example, when the above-described ring-shaped die is used, the width (W) is inevitably substantially the same from the base to the tip portion.

The thickness (S) at the top of the male-type engaging element is preferably 0.15 to 0.35 mm and less than the width (W).

In the male-type molded hook-and-loop fastener shown in FIG. 2, the individual male-type engaging elements are not branched on the way to the tip portion or at the tip. This prevents the male-type engaging element from being cut when it is pulled out from the cavity.

As described above, the base plate of the male-type molded hook-and-loop fastener (A) having an inverted J-shaped engaging element preferably has a thickness (T) of 0.1 to 0.3 mm in terms of flexibility and strength along a curved surface. The density of the inverted J-shaped engaging elements present on the base plate is preferably 60 to 160 elements/$cm^2$, and particularly preferably 80 to 140 elements/$cm^2$. Here, the "engaging element density" means the number (element number) of engaging elements present per unit area (1 $cm^2$) when the male-type molded hook-and-loop fastener (A) is viewed from directly above.

In the male-type molded hook-and-loop fastener (A) having the inverted J-shaped engaging elements, as shown in FIG. 2, a plurality of male-type engaging elements bent in the same direction are arranged in a row in the same direction as the bending direction. Further, a plurality of male-type engaging elements bent in the opposite direction may be arranged in another row in the same direction as the bending direction.

The interval (E) between two adjacent male-type engaging elements in the same row is preferably 1.2 to 2.2 mm, and more preferably 1.3 to 1.8 mm. That is, the male-type engaging elements are preferably present at a proportion of one element in 1.2 to 2.2 mm in the row direction, and more preferably at a proportion of one element in 1.3 to 1.8 mm.

The interval between two adjacent engaging element rows is preferably 0.4 to 1.0 mm, and more preferably 0.5 to 0.8 mm. That is, the rows of male-type engaging elements are preferably present in one row in a width of 0.4 to 1.0 mm of the base plate, and more preferably in one row in a width of 0.5 to 0.8 mm of the base plate.

As described above, the inverted J-shaped engaging element preferably rises from the surface of the ridge portion (6) formed on the surface of the base plate. In order to achieve this, it is preferable to adopt a method in which the diameter of the ring-shaped die for the engaging elements is made slightly smaller than the diameter of the ring-shaped die without the engaging elements. The height of the ridge portion (6) is preferably 2 to 30% of the height (H) of the inverted J-shaped engaging element.

Next, the laser light absorbing layer (B) formed of a thermoplastic resin and integrated with the back surface side of the male-type molded hook-and-loop fastener (A) will be described. The laser light absorbing layer (B) functions as a melt adhesive layer for bonding the male-type molded hook-and-loop fastener (A) to the back surface of the interior material for automobiles. Since welding is performed by a laser welding method, the laser light absorbing layer (B) is a layer that is melted by the laser light and is made of a thermoplastic resin containing a sufficient amount of a substance that absorbs the laser light.

Examples of the substance that absorbs the laser light include organic compounds such as phthalocyanine-based compounds, cyanine-based compounds, polymethine-based compounds, anthraquinone-based compounds, and azo-based compounds; and inorganic compounds such as metals and metal compounds. Carbon black powder is particularly preferred because it reliably absorbs the laser light. The content of the laser light absorbing substance in the laser light absorbing layer (B) is preferably 0.01 to 1.0% by weight.

The thermoplastic resin forming the laser light absorbing layer (B) is preferably a resin having a melting point of 130 to 270° C., and examples thereof include polyester-based resins, polyamide-based resins, and polyolefin-based resins, with polyester-based resins being preferred. In particular, aliphatic polyesters and aromatic polyesters having a melting point lowered by copolymerization are preferred.

The laser light absorbing layer (B) can be obtained by forming a blend of the thermoplastic resin and the laser light absorbing substance into a film, or by forming fibers spun from the blend into a fabric such as a non-woven fabric or a woven or knitted fabric.

The bases weight of the laser light absorbing layer (B) is preferably 50 to 300 g/m$^2$ in order to obtain sufficient adhesive force and in order to prevent the male-type engaging elements of the male-type molded hook-and-loop fastener (A) from falling down due to heat from the laser light absorbing layer (B) at the time of pressure bonding.

When the male-type engaging element is an arrowhead type engaging element, the basis weight is more preferably 50 to 200 g/m$^2$, and still more preferably 60 to 120 g/m$^2$.

When the male-type engaging element is an inverted J-shaped engaging element, the basis weight is more preferably 60 to 220 g/m$^2$.

Since the laser weldable hook-and-loop fastener of the present invention is welded to the back surface of the interior material for automobiles by irradiation with the laser light as described above, the male-type molded hook-and-loop fastener (A) on the front surface side is not affected by transmission of the laser light, and the laser light absorbing layer (B) present on the back surface is selectively melted by the laser light.

Accordingly, the infrared transmittance at a wavelength of 980 nm is preferably 50% or more, more preferably 55% or more, and still more preferably 60% or more, and preferably 95% or less in the male-type molded hook-and-loop fastener (A). In the laser light absorbing layer (B), it is preferably 10% or less, and more preferably 0 to 10%.

The infrared absorptance at a wavelength of 980 nm is preferably 30% or less, and more preferably 25% or less, and preferably 4% or more, and more preferably 5% or more in the male-type molded hook-and-loop fastener (A). In the laser light absorbing layer (B), it is preferably 85% or more, and more preferably 85 to 100%.

In order to make the infrared transmittance and the infrared absorptance of the male-type molded hook-and-loop fastener (A) fall within the above-described ranges, the male-type molded hook-and-loop fastener (A) may be formed of the above-described resin, the thickness of the base plate may fall within the above-described range, and a substance that prevents transmission of infrared rays may not be substantially added. The size of the male-type engaging element may be within the range described above. With respect to the laser light absorbing layer (B), when the addition amount of the laser light absorbing substance and the basis weight are within the above-described ranges, the above-described infrared transmittance and infrared absorptance are achieved.

When the infrared transmittance at a wavelength of 980 nm of the male-type molded hook-and-loop fastener (A) is less than 50% or when the infrared absorptance at a wavelength of 980 nm of the male-type molded hook-and-loop fastener (A) exceeds 30%, the male-type molded hook-and-loop fastener (A) also generates heat due to laser irradiation, and the male-type engaging element may be deformed. In addition, since the laser light does not reach sufficiently, heat generation of the laser light absorbing layer (B) is insufficient, and it becomes difficult to weld to the interior material for automobiles.

When the infrared transmittance at a wavelength of 980 nm of the laser light absorbing layer (B) exceeds 10% or when the infrared absorptance at a wavelength of 980 nm of the laser light absorbing layer (B) is less than 85%, heat generation of the laser light absorbing layer (B) is insufficient, and in some cases, a problem such as melting of the interior material for automobiles on which the laser weldable hook-and-loop fastener is placed occurs.

For example, it is preferable that the male-type molded hook-and-loop fastener (A) is made of semi-aromatic polyamide, the male-type engaging element is an inverted J-shaped engaging element, the thickness of the base plate is 0.1 to 0.3 mm, and the height of the male-type engaging element from the base plate surface is 0.35 to 1.5 mm because the male-type molded hook-and-loop fastener (A) transmits the laser light without being affected by the laser light and the laser light absorbing layer (B) can be selectively melted and efficiently laser-welded.

The infrared transmittances at a wavelength of 980 nm and the infrared absorptance at a wavelength of 980 nm were measured using UV3600-Plus manufactured by Shimadzu Corporation under the conditions of a slit width of −32 and a grating switching wavelength of 720 nm, and an average value obtained by measuring 10 arbitrary points on the surface was shown.

The laser light absorbing layer (B) is integrated with the back side of the male-type molded hook-and-loop fastener (A) by, for example, the following methods.

A method in which the laser light absorbing layer (B) is superposed on the back side of the male-type molded hook-and-loop fastener (A) and integrated when the male-type molded hook-and-loop fastener (A) is molded in a molten state.

A method in which an adhesive is applied to one or both of the male-type molded hook-and-loop fastener (A) and the laser light absorbing layer (B) which have been separately produced, and then superposed and bonded to each other.

The adhesive used in the above method is not particularly limited, but is preferably a reactive hot melt adhesive that can be cured by moisture to obtain a strong adhesive force, and particularly preferably a urethane-based reactive hot melt adhesive. It is preferable that the adhesive layer sufficiently transmits the laser light without substantially absorbing the laser light so as to satisfy the above-described infrared transmittance and infrared absorptance. For example, when the thickness of the adhesive layer is 0.3 mm, it is preferable that the infrared transmittance at a wavelength of 980 nm is 70% or more and the infrared absorptance at a wavelength of 980 nm is 5% or less.

The male-type molded hook-and-loop fastener (A) may be dyed with an acid dye or a disperse dye. By dyeing the male-type molded hook-and-loop fastener (A) in a color tone different from that of the interior material for automobiles, laser welding to an accurate position of the interior material for automobiles is facilitated. However, it is important to use a dye which hardly hinders transmission of laser light even when the male-type molded hook-and-loop fastener (A) is dyed.

The laser weldable hook-and-loop fastener of the present invention is welded to the back surface of an interior material for automobiles such as a ceiling material or a floor material.

The method for manufacturing the interior material for automobiles, having the laser weldable hook-and-loop fastener welded to the back surface thereof includes the steps of: superposing the laser weldable hook-and-loop fastener at a predetermined position on the back surface of the interior material for automobiles via a laser light absorbing layer (B); irradiating laser light from the front surface side of the laser weldable hook-and-loop fastener to melt the laser light absorbing layer (B) without melting the male-type molded hook-and-loop fastener (A); and pressure bonding the laser weldable hook-and-loop fastener to the back surface of the interior material for automobiles while the laser light absorbing layer (B) is melted to weld the laser weldable hook-and-loop fastener to the back surface of the interior material for automobiles.

The wavelength of the laser light is preferably 740 to 1000 nm, and the laser light irradiation time is preferably 0.01 to 20.00 seconds.

As the interior material for automobiles, those generally used can be used. For example, a sheet obtained by laminating a non-woven fabric, a glass fiber mat, a foamed resin layer, a pile fabric, a woven or knitted fabric, a natural or artificial leather, or the like, with a non-woven fabric layer present on a back surface side (a surface to which the laser weldable hook-and-loop fastener is welded) is preferred.

EXAMPLES

The present invention will be specifically described below with reference to Examples and Comparative Examples. In Examples and Comparative Examples, the laser weldability and the presence or absence of falling of the male-type engaging element were evaluated as follows.

(Laser Weldability)

The male-type molded hook-and-loop fastener laser-welded to the back surface of the ceiling material for automobiles was peeled off, and the peeled surface was observed to evaluate the welded state.

(Presence or Absence of Falling of Male-Type Engaging Element)

The state of the male-type engaging element on the surface of the male-type molded hook-and-loop fastener laser-welded to the back surface of the ceiling material for automobiles was observed with a loupe, and the degree of falling of the male-type engaging element was observed.

In addition, initial engaging forces at a normal temperature (20° C.) and 110° C. of the male-type hook-and-loop fastener laser-welded to the back surface of the ceiling material for automobiles were measured in accordance with JIS L3416 (2000). A woven fabric hook-and-loop fastener made of polyphenylene sulfide ("MAGIC TAPE" (registered trademark) B48000.00, manufactured by Kuraray Fastening Co., Ltd.) was used as an engaging counterpart female-type engaging element.

Production Example 1: Production of Male-Type Molded Hook-and-Loop Fastener (A-1)

A polyester elastomer ("Hytrel" (registered trademark) 6377 manufactured by Du Pont-Toray Co., Ltd.) was extruded using a nozzle having the same cross-sectional shape as viewed from the arrow (X) direction of FIG. 1 except that the male-type engaging elements were two stage arrowhead type engaging elements, and cooled to form a tape-shaped article having a plurality of male-type engaging element rows continuous in the longitudinal direction.

As shown in FIG. 1, on the base plate (1) made of a polyester elastomer, rows for male-type engaging elements (2) made of the same polyester elastomer and having two upper and lower stages of protruding portions had risen.

The width of the tape-shaped article was 40 mm, and the number of the rows was six rows per 1 cm of the tape width.

With respect to the rows, cut portions were made at intervals of 0.5 mm in a direction orthogonal to the longitudinal direction of the rows from the tip of the rows to the position of $4/5$ (from the bottom to $1/5$) of the height of the rows. Next, the tape-shaped article was stretched 1.4 times in the longitudinal direction to obtain a male-type molded hook-and-loop fastener (A-1).

The male-type molded hook-and-loop fastener (A-1) thus obtained had a base plate thickness (T) of 0.3 mm, and an engaging element height (H) from the base plate surface of 2.7 mm, the male-type engaging element had a thickness (L) in the engaging element row direction of 0.54 mm, the gap (W) between the stem portions of two adjacent male-type engaging elements was 0.61 times the thickness (L), and the engaging element density was 51.2 elements/cm$^2$. Note that the protruding length of the protruding portion of the lower stage of the two stage arrowhead type engaging element was longer than the protruding portion of the upper stage. As shown in FIG. 1, the top portion of the stem had a projection for preventing sticking, and the height thereof was 21.1% of the height of the male-type engaging element. In addition, as shown in FIG. 1, there was a ridge portion having a height of 0.57 mm which was continuous in the row direction of the male-type engaging elements on the surface of the base plate, and the male-type engaging elements had risen from the surface of the ridge portion and were formed in rows along the continuous ridges.

The infrared transmittance and absorptance of the male-type molded hook-and-loop fastener (A-1) at a wavelength of 980 nm were 56.4% and 22.0%, respectively.

Production Example 2: Production of Male-Type Molded Hook-and-Loop Fastener (A-2)

A male-type molded hook-and-loop fastener (A-2) was produced in the same manner as in Production Example 1, except that the polyester elastomer was changed to polypropylene. The infrared transmittance and absorptance of the male-type molded hook-and-loop fastener (A-2) at a wavelength of 980 nm were 46.2% and 30.5%, respectively.

Production Example 3: Production of Male-Type Molded Hook-and-Loop Fastener (A-3)

A male-type molded hook-and-loop fastener (A-3) was produced in the same manner as in Production Example 1 except that the polyester elastomer was changed to nylon-6 containing 5% by weight of titanium oxide. The infrared transmittance and absorptance of the male-type molded hook-and-loop fastener (A-3) at a wavelength of 980 nm were 3.2% and 9.6%, respectively.

Production Example 4: Production of Male-Type Molded Hook-and-Loop Fastener (A-4)

A male-type molded hook-and-loop fastener (A-4) was produced in the same manner as in Production Example 1 except that the two stage arrowhead type engaging element was changed to a one stage arrowhead type engaging element as shown in FIG. 1 in which the height was 2.2 mm and the height of the sticking preventing projection was 30% of the height of the male-type engaging element. The infrared transmittance and absorptance of the male-type molded hook-and-loop fastener (A-4) at a wavelength of 980 nm were 58.6% and 19.8%, respectively.

Production Example 5: Production of Male-Type Molded Hook-and-Loop Fastener (A-5)

A semi-aromatic polyamide, 10% by weight of an elastomer based on the semi-aromatic polyamide, and 0.2% by weight of carbon black powder based on the total amount of the semi-aromatic polyamide and the elastomer were mixed and pelletized.

As the semi-aromatic polyamide, a terminal amino group-containing semi-aromatic polyamide (semi-aromatic polyamide "Genestar" (registered trademark) manufactured by Kuraray Co., Ltd., [η]=1.20 dl/g) obtained by using a mixed diamine component composed of 50 mol % of 1,9-nonanediamine and 50 mol % of 2-methyl-1,8-octanediamine and an aromatic dicarboxylic acid component composed of terephtalic acid was used.

As the elastomer, a maleic anhydride-modified polyolefin-based elastomer ("Tafmer" (registered trademark) manufactured by Mitsui Chemicals, Inc.) was used.

Next, as a die, a ring-shaped die having a thickness of 0.30 mm and a diameter of 211.8 mm in which a cavity having the shape of an inverted J-shaped engaging element is engraved on the outer circumference, a metal ring having a thickness of 0.30 mm and a diameter of 212 mm in which the cavity having the shape of the inverted J-shaped engaging element is not engraved, a ring-shaped die having a thickness of 0.30 mm and a diameter of 211.8 mm in which a cavity having the shape of an inverted J-shaped engaging element facing in the direction opposite to that of the above-mentioned inverted J-shaped engaging element is engraved on the outer circumference, and a metal ring having a thickness of 0.30 mm and a diameter of 212 mm in which the cavity having the shape of the inverted J-shaped engaging element is not engraved, are successively superposed to prepare a die roll having a width of 120 mm and having a large number of cavities having the shape of an inverted J-shaped engaging element and a large number of cavities having the shape of an inverted J-shaped engaging element facing the opposite direction, on the surface thereof.

A melt (temperature: 300° C.) of the pellets was extruded and pressed into a gap between the die roll and another drum roll disposed at a position facing the die roll, thereby filling the cavity with a molten resin and forming a sheet having a uniform thickness on the roll surface. While the die roll was rotating, the resin in the cavity was cooled by water constantly circulating in the roll. The cooled and solidified sheet was peeled off from the surface of the die roll while being stretched by a nip roll whose gap was adjusted so that the thickness of the base plate to be obtained was 0.20 mm, thereby producing a male-type molded hook-and-loop fastener (A-5).

The obtained male-type molded hook-and-loop fastener (A-5) had a shape as shown in FIG. 2. That is, the obtained male-type molded hook-and-loop fastener had a large number of inverted J-shaped engaging elements which do not have a branch in the middle or at the tip portion, were gradually tapered from the root to the tip, were gradually bent in the middle, with the tip portion facing in a direction slightly approaching the base plate. Further, a plurality of inverted J-shaped engaging elements were arranged in rows in the same direction as the direction in which the inverted J-shaped engaging elements were bent, and the bending direction was reversed for each row.

The inverted J-shaped engaging element had a shape as shown in FIG. 2. The height (H) from the base plate surface was 1.25 mm, and the lower end of the tip portion of the inverted J-shaped engaging element was close to the base plate by a distance corresponding to 5% of the height (H) from the lower end of the top portion. The width (W) of the top portion was 0.30 mm, the thickness (S) of the top portion was 0.23 mm, and the spread (C) of the base portion was 0.98 mm. The inverted J-shaped engaging element gradually began to bend from the vicinity of a height of ⅔ of the height (H) from the base. The density of the inverted J-shaped engaging elements was 110 elements/cm$^2$, the thicknesses of the base plate was 0.20 mm, the interval (E) between two inverted J-shaped engaging elements adjacent to each other in the row direction was 1.50 mm, and the interval between adjacent engaging element rows was 0.60 mm.

As shown in FIG. 2, there was a ridge portion having a height of 0.2 mm, which was continuous in the row direction of the engaging elements, on the surface of the base plate, and the inverted J-shaped engaging elements had risen from the upper surface of the ridge portion, and the row of the inverted J-shaped engaging elements was formed along the ridge of the continuous ridge portion. The infrared transmittance and absorptance of the male-type molded hook-and-loop fastener (A-5) at a wavelength of 980 nm were 76.1% and 4.9%, respectively.

Production Example 6: Production of Male-Type Molded Hook-and-Loop Fastener (A-6)

A male-type molded hook-and-loop fastener (A-6) was produced in the same manner as in Production Example 5 except that the mixture of the semi-aromatic polyamide and the elastomer was changed to polypropylene. The infrared transmittance and absorptance of the male-type molded hook-and-loop fastener (A-6) at a wavelength of 980 nm were 62.2% and 6.8%, respectively.

Production Example 7: Production of Male-Type Molded Hook-and-Loop Fastener (A-7)

A male-type molded hook-and-loop fastener (A-7) was produced in the same manner as in Production Example 5 except that the mixture of the semi-aromatic polyamide and the elastomer was changed to nylon-6 containing 5% by weight of titanium oxide. The infrared transmittance and absorptance of the male-type molded hook-and-loop fastener (A-7) at a wavelength of 980 nm were 2.4% and 6.4%, respectively.

Production Example 8: Production of Male-Type Molded Hook-and-Loop Fastener (A-8)

A male-type molded hook-and-loop fastener (A-8) was produced in the same manner as in Production Example 5 except that the height (H) of the inverted J-shaped engaging element from the base plate surface was reduced to 0.95 mm. The infrared transmittance and absorptance of the male-type molded hook-and-loop fastener (A-8) at a wavelength of 980 nm were 72.9% and 5.5%, respectively.

Production Example 9: Production of Laser Light Absorbing Layer (B-1)

A thermally fusion-fixing non-woven fabric having a basis weight of 80 g/m$^2$ was produced by using 8 dtex fibers made of polyethylene terephthalate (melting point: 260° C.) containing 0.2% by weight of carbon black. The infrared transmittance and absorptance of the laser light absorbing layer (B-1) at a wavelength of 980 nm were 2.5% and 92.8%, respectively.

Production Example 10: Production of Laser Light Absorbing Layer (B-2)

A film having a basis weight of 115 g/m$^2$ was produced, which was made of isophthalic acid-copolymerized polyethylene terephthalate (melting point: 230° C.) containing 0.3% by weight of carbon black. The infrared transmittance and absorptance of the laser light absorbing layer (B-2) at a wavelength of 980 nm were 4.2% and 91.5%, respectively.

Production Example 11: Production of Laser Light Absorbing Layer (B-3)

A film having a basis weight of 120 g/m$^2$ was produced, which was made of nylon-6 (melting point: 225° C.) containing 0.2% by weight of carbon black. The infrared transmittance and absorptance of the laser light absorbing layer (B-3) at a wavelength of 980 nm were 4.8% and 89.3%, respectively.

Production Example 12: Production of Laser Light Absorbing Layer (B-4)

A film having a basis weight of 115 g/m$^2$ was produced, which was made of isophthalic acid-copolymerized polyethylene terephthalate (melting point: 230° C.) containing no carbon black. The infrared transmittance and absorptance of the laser light absorbing layer (B-4) at a wavelength of 980 nm were 68.7% and 7.3%, respectively.

Examples 1 to 4 and Comparative Examples 1 to 3

A male-type molded hook-and-loop fastener (A) selected from the male-type molded hook-and-loop fasteners (A-1) to (A-4) and a laser light absorbing layer (B) selected from the laser light absorbing layers (B-1) to (B-4) were combined as shown in Table 1 to produce a laser weldable hook-and-loop fastener in which the laser light absorbing layer (B) was integrated with the back surface of the male-type molded hook-and-loop fastener (A).

A urethane-based reactive hot-melt adhesive (Hi-Bon 4830 manufactured by Showa Denko Materials Co., Ltd.) was used to integrate the male-type molded hook-and-loop fastener (A) and the laser light absorbing layer (B), and was applied in an amount of 0.3 mm in thickness. The infrared transmittance and absorptance of the adhesive layer having a thickness of 0.3 mm at a wavelength of 980 nm were 76.5% and 3.6%, respectively.

The laser weldable hook-and-loop fastener thus obtained was placed at a predetermined position of a ceiling material for automobiles via the laser light absorbing layer (B) on the back surface, and laser light (wavelength: 940 nm) was irradiated from the front surface side of the male-type molded hook-and-loop fastener (A) for 2 seconds to strongly press the male-type molded hook-and-loop fastener (A) from the front surface side, thereby welding it to the back surface of the ceiling material for automobiles.

The ceiling material for automobiles used was produced by covering both surfaces of a layer having a thickness of 8 mm and made of foamed polyurethane with a glass-fiber mat (basis weight: 100 mm/m$^2$) impregnated with a thermosetting isocyanate compound, covering one side (front side) with artificial leather, a soft foamed polyurethane layer, and then an entangled non-woven fabric made of polyester fibers, and laminating a laminate (hot melt polyolefin layer/1 mm thick polypropylene layer/1 mm thick entangled non-woven fabric made of polyester fibers) on the opposite side (back side) so that the entangled non-woven fabric is on the outside.

The evaluation results of Examples 1 to 4 and Comparative Examples 1 to 3 are shown in Table 1. Further, the measurement results of the initial engaging force of the male-type molded hook-and-loop fastener (A) after laser welding to the ceiling material for automobiles are shown in Table 2.

TABLE 1

| | Male-type molded hook-and-loop fastener (A) | Laser light absorbing layer (B) | Laser weldability | Falling of male-type engaging element |
|---|---|---|---|---|
| Example 1 | A-1 | B-1 | Firmly welded | None |
| Example 2 | A-1 | B-3 | Although not firmly, it was welded to the extent that there is no substantial problem. | Slightly falling |

TABLE 1-continued

| | Male-type molded hook-and-loop fastener (A) | Laser light absorbing layer (B) | Laser weldability | Falling of male-type engaging element |
|---|---|---|---|---|
| Example 3 | A-1 | B-2 | Firmly welded | None |
| Example 4 | A-4 | B-1 | Firmly welded | None |
| Comparative Example 1 | A-1 | B-4 | No weldability | — |
| Comparative Example 2 | A-2 | B-1 | Firmly welded | Many falling |
| Comparative Example 3 | A-3 | B-1 | No weldability | Melting and falling of the engaging element by laser light |

TABLE 2

| | Initial engaging force at normal temperature | | Initial engaging force at 110° C. | |
|---|---|---|---|---|
| | Tensile shear strength (N/cm$^2$) | Peel strength (N/cm) | Tensile shear strength (N/cm$^2$) | Peel strength (N/cm) |
| Example 1 | 59.7 | 4.91 | 29.2 | 1.96 |
| Example 2 | 37.3 | 2.97 | 17.6 | 1.09 |
| Example 3 | 55.2 | 4.42 | 27.9 | 1.82 |
| Example 4 | 45.7 | 3.62 | 22.3 | 1.56 |
| Comparative Example 2 | 21 | 2.12 | 2.9 | 0.42 |

As shown in Table 1, in Examples 1, 3 and 4, the male-type molded hook-and-loop fasteners (A-1) and (A-4) could be firmly welded to the back surface of the ceiling material for automobiles by laser welding, and there was no falling male-type engaging element at all. Further, it exhibited an excellent engaging force even at a normal temperature (20° C.) and a high temperature of 110° C., and there was no problem as a hook-and-loop fastener for fixing to a ceiling material for automobiles.

In Example 2, the laser weldability of the laser light absorbing layer (B-3) was somewhat weak, and welding could be performed by irradiation with laser light for a long period of time. Some of the male-type engaging elements were slightly fallen by pressure bonding at the time of laser welding, and the engaging force was slightly inferior to that of Example 1, but there was no problem in practical use. It is assumed that this is caused by slight damage to the engaging element at the time of laser welding.

In Comparative Example 1, since the laser light absorbing layer (B-4) did not absorb laser light, it was not melted by laser light. As a result, the male-type molded hook-and-loop fastener (A-1) could not be welded to the back surface of the ceiling material for automobiles. Therefore, the engaging force could not be measured.

In Comparative Example 2, although the male-type molded hook-and-loop fastener (A-2) could be firmly welded by laser welding, some of the male-type engaging elements were melted by heat at the time of welding, and many of the male-type engaging elements fell down. The engaging force of the male-type molded hook-and-loop fastener (A-2) after laser welding was far inferior to those of Example 1 and Example 2, and it is assumed that the male-type engaging element was largely damaged at the time of laser welding.

In Comparative Example 3, most of the laser light was shielded by the male-type molded hook-and-loop fastener (A-3) and did not reach the laser light absorbing layer (B-1). As a result, the male-type molded hook-and-loop fastener (A-3) could not be welded to the ceiling material for automobiles. Therefore, the engaging force could not be measured.

Examples 5 to 8 and Comparative Examples 4 to 6

Laser weldable hook-and-loop fasteners were produced in the same manner as in the methods described in Examples 1 to 4 and Comparative Examples 1 to 3 except that the male-type molded hook-and-loop fastener (A) selected from the male-type molded hook-and-loop fasteners (A-5) to (A-8) and the laser light absorbing layer (B) selected from the laser light absorbing layers (B-1) to (B-4) were combined as shown in Table 3, and the obtained laser weldable hook-and-loop fasteners were welded to the back surface of the ceiling material for automobiles.

The evaluation results of Examples 5 to 8 and Comparative Examples 4 to 6 are shown in Table 3. Further, the measurement results of the initial engaging force of the male-type molded hook-and-loop fastener (A) after laser welding to the ceiling material for automobiles are shown in Table 4.

TABLE 3

| | Male-type molded hook-and-loop fastener (A) | Laser light absorbing layer (B) | Laser weldability | Falling of male-type engaging element |
|---|---|---|---|---|
| Example 5 | A-5 | B-1 | Firmly welded | None |
| Example 6 | A-5 | B-3 | Although not firmly, it was welded to the extent that there is no substantial problem. | Slightly falling |
| Example 7 | A-5 | B-2 | Firmly welded | None |
| Example 8 | A-8 | B-1 | Firmly welded | None |
| Comparative Example 4 | A-5 | B-4 | No weldability | — |

TABLE 3-continued

|  | Male-type molded hook-and-loop fastener (A) | Laser light absorbing layer (B) | Laser weldability | Falling of male-type engaging element |
|---|---|---|---|---|
| Comparative Example 5 | A-6 | B-1 | Firmly welded | Many falling |
| Comparative Example 6 | A-7 | B-1 | No weldability | Melting and falling of the engaging element by laser light |

TABLE 4

|  | Initial engaging force at normal temperature | | Initial engaging force at 110° C. | |
|---|---|---|---|---|
|  | Tensile shear strength (N/cm$^2$) | Peel strength (N/cm) | Tensile shear strength (N/cm$^2$) | Peel strength (N/cm) |
| Example 5 | 83.6 | 5.77 | 51.2 | 3.11 |
| Example 6 | 56.9 | 3.89 | 34 | 2.56 |
| Example 7 | 80.2 | 5.34 | 48.4 | 2.94 |
| Example 8 | 62.7 | 4.12 | 36.2 | 2.67 |
| Comparative Example 5 | 25.6 | 2.23 | 2.1 | 0.35 |

As shown in Table 3, in Examples 5, 7 and 8, the male-type molded hook-and-loop fasteners (A-5) and (A-8) could be firmly welded to the back surface of the ceiling material for automobiles by laser welding, and there was no falling male-type engaging element at all.

In Example 6, the laser weldability of the laser light absorbing layer (B-3) was somewhat weak, and welding could be performed by irradiation with laser light for a long period of time. Some of the male-type engaging elements were slightly fallen by pressure bonding at the time of laser welding, but there was no problem in practical use.

In Comparative Example 4, since the laser light absorbing layer (B-4) did not absorb laser light, it was not melted by laser light. As a result, the male-type molded hook-and-loop fastener (A-5) could not be welded to the back surface of the ceiling material for automobiles.

In Comparative Example 5, although the male-type molded hook-and-loop fastener (A-6) could be firmly welded by laser welding, some of the male-type engaging elements were melted by heat at the time of welding, and many of the male-type engaging elements fell down.

In Comparative Example 6, most of the laser light was absorbed by the male-type molded hook-and-loop fastener (A-7) and did not reach the laser light absorbing layer (B-1). As a result, the male-type molded hook-and-loop fastener (A-7) could not be welded to the ceiling material for automobiles.

Reference Examples 1 and 5

Laser weldable hook-and-loop fasteners produced by using male-type molded hook-and-loop fasteners having different heights of ridge portions were laser-welded to the back surface of the ceiling material for automobiles by changing a laser irradiation time.

The male-type molded hook-and-loop fastener (A) and the laser absorbing layer (B) used are shown in Table 5.

TABLE 5

|  | Male-type molded hook-and-loop fastener (A) | Laser light absorbing layer (B) |
|---|---|---|
| Reference Example 1 | Produced similarly to A-5 (inverted J-shaped engaging element) Height of ridge portion: 0.15 mm | B-1 |
| Reference Example 2 | Produced similarly to A-1 (two stage arrowhead type engaging element) Height of ridge portion: 0.55 mm | B-1 |
| Reference Example 3 | Produced similarly to A-4 (one stage arrowhead type engaging element) Height of ridge portion: 0.80 mm | B-1 |
| Reference Example 4 | Produced similarly to A-5 (inverted J-shaped engaging element) No ridge portion | B-1 |
| Reference Example 5 | Produced similarly to A-1 (two stage arrowhead type engaging element) No ridge portion | B-1 |

The initial engaging force (peel strength) at a normal temperature (20° C.) was determined in the same manner as described above. The retention ratio of the peel strength (ratio (%) to the peel strength before laser welding) is shown in Table 6.

TABLE 6

|  | Height of ridge portion (mm) | Laser irradiation time (seconds) | | | |
|---|---|---|---|---|---|
|  |  | 2 | 5 | 10 | 15 |
| Reference Example 1 | 0.15 | 98.10% | 95.80% | 90.50% | 82.30% |
| Reference Example 2 | 0.55 | 97.80% | 96.10% | 94.50% | 87.50% |
| Reference Example 3 | 0.8 | 96.20% | 92.20% | 95.50% | 90.30% |
| Reference Example 4 | 0.01 | 89.10% | 71.70% | 45.90% | 15.50% |
| Reference Example 5 | 0.05 | 82.60% | 63.50% | 55.40% | 20.30% |

Laser welding conditions: power 30 W, wavelength 940 nm, pressure 0.6 Mpa

As is clear from Table 6, in Reference Examples 1 to 3 having a ridge portion, even when the laser irradiation time was increased, the peel strength before laser welding was maintained at a practically acceptable level. This indicates that deformation (melting, falling, or the like) of the male-type engaging element is unlikely to occur at the time of laser welding.

In Reference Examples 4 and 5 in which no ridge portion was present, the retention ratio of the peel strength was significantly decreased as the laser irradiation time was increased. This shows that the deformation of the male-type engaging element at the time of laser welding was significant, and the engaging force was reduced.

Therefore, in order to keep the engaging force of the male-type engaging element after laser welding high, it is preferable to provide a ridge portion.

REFERENCE SIGNS LIST

1: Base plate
2: Male-type engaging element
3: Row of male-type engaging elements
4: Stem
5: Protruding portion
6: Ridge portion
7: Sticking preventing projection
A: Male-type molded hook-and-loop fastener (A)
B: Laser light absorbing layer (B)
T: Base plate thickness
H: Height of male-type engaging element
L: Stem width
$W_0$: Gap between stems
W: Width of male-type engaging element in top portion
S: Thickness of male-type engaging element in top portion
C: Spread of male-type engaging element base portion
E: Interval between male-type engaging elements adjacent in row direction

The invention claimed is:

1. A laser weldable hook-and-loop fastener comprising a laser light transmitting male-type molded hook-and-loop fastener (A) and a laser light absorbing layer (B) formed of a thermoplastic resin, which is integrated on the back surface of the male-type molded hook-and-loop fastener (A), wherein the male-type molded hook-and-loop fastener (A) has a base plate and a large number of male-type engaging elements rising from the surface of the base plate, the male-type engaging elements and the base plate are formed of the same resin selected from a polyester elastomer and a polyamide, the male-type engaging elements are arranged in a row, and the laser light absorbing layer (B) has an infrared absorptance of 85% or more at a wavelength of 980 nm.

2. The laser weldable hook-and-loop fastener according to claim 1, wherein the male-type engaging element has a stem portion rising from the base plate and a protruding portion protruding symmetrically from the stem portion in a direction substantially orthogonal to a row direction of the male-type engaging elements from the middle or the tip thereof, and the tip of the protruding portion approaches the surface of the base plate.

3. The laser weldable hook-and-loop fastener according to claim 2, wherein the base plate of the male-type molded hook-and-loop fastener (A) has a thickness of 0.1 to 0.3 mm, and a height of the male-type engaging element from the surface of the base plate is 2 to 4 mm.

4. The laser weldable hook-and-loop fastener according to claim 2, wherein a gap between the stem portions of two male-type engaging elements adjacent to each other in the row direction is 0.3 to 0.8 times a width of the stem portion of the male-type engaging element in the row direction.

5. The laser weldable hook-and-loop fastener according to claim 2, wherein the male-type engaging element and the base plate are formed of a polyester elastomer.

6. The laser weldable hook-and-loop fastener according to claim 1, wherein the male-type engaging element is an engaging element that rises from the base plate, gradually tapers from a root to a tip without branching in the middle or at the tip, bends in the same direction as the row direction of the male-type engaging elements in the middle, and the tip thereof has a shape approaching the surface of the base plate.

7. The laser weldable hook-and-loop fastener according to claim 6, wherein the base plate of the male-type molded hook-and-loop fastener (A) has a thickness of 0.1 to 0.3 mm, and a height of the male-type engaging element from the surface of the base plate is 0.35 to 1.5 mm.

8. The laser weldable hook-and-loop fastener according to claim 6, wherein the male-type engaging element and the base plate are formed of a polyamide, and the polyamide is a semi-aromatic polyamide.

9. The laser weldable hook-and-loop fastener according to claim 8, wherein the semi-aromatic polyamide is a semi-aromatic polyamide obtained from 1,9-nonanediamine and terephthalic acid as main components or a semi-aromatic polyamide obtained from a mixed diamine comprising 1,9-nonanediamine and 2-methyl-1,8-octanediamine and terephthalic acid as main components.

10. The laser weldable hook-and-loop fastener according to claim 8, wherein an elastomer is blended with the semi-aromatic polyamide.

11. The laser weldable hook-and-loop fastener according to claim 1, wherein an infrared transmittance at a wavelength of 980 nm is 50% or more in the male-type molded hook-and-loop fastener (A) and 10% or less in the laser light absorbing layer (B), and an infrared absorptance at a wavelength of 980 nm is 30% or less in the male-type molded hook-and-loop fastener (A).

12. The laser weldable hook-and-loop fastener according to claim 1, wherein a continuous ridge portion is present on the surface of the base plate in a row direction of the engaging elements, the male-type engaging elements rise from the surface of the ridge portion, and the row of the male-type engaging elements is formed along the ridge of the continuous ridge portion.

13. The laser weldable hook-and-loop fastener according to claim 1, wherein the laser light absorbing layer (B) is a fabric made of fibers comprising carbon black and having a melting point of 130 to 270° C. or a film made of a resin comprising carbon black and having a melting point of 130 to 270° C., and the fabric and the film have a basis weight of 50 to 200 g/m$^2$.

14. The laser weldable hook-and-loop fastener according to claim 1, wherein the male-type molded hook-and-loop fastener (A) is dyed with an acid dye or a disperse dye.

15. A method of manufacturing an interior material for automobiles having the laser weldable hook-and-loop fastener according to claim 1 welded to the back surface thereof, the method comprising:
    placing the laser weldable hook-and-loop fastener at a predetermined position on the back surface of the interior material for automobiles via the laser light absorbing layer (B);
    irradiating laser light from the front surface side of the laser weldable hook-and-loop fastener to melt the laser light absorbing layer (B) without melting the male-type molded hook-and-loop fastener (A); and
    pressure bonding the laser weldable hook-and-loop fastener to the back surface of the interior material for automobiles while the laser light absorbing layer (B) is melted to weld the laser weldable hook-and-loop fastener to the back surface of the interior material for automobiles.

* * * * *